United States Patent [19]

Peinemann

[11] Patent Number: 4,673,418

[45] Date of Patent: Jun. 16, 1987

[54] METHOD FOR PRODUCING AN INTEGRAL, ASYMMETRIC MEMBRANE AND THE RESULTANT MEMBRANE

[75] Inventor: Klaus-Viktor Peinemann, Lauenburg, Fed. Rep. of Germany

[73] Assignee: GKSS Forschungszentrum GmbH, Geesthacht, Fed. Rep. of Germany

[21] Appl. No.: 739,873

[22] Filed: May 31, 1985

[30] Foreign Application Priority Data

Jun. 1, 1984 [DE] Fed. Rep. of Germany ....... 3420373

[51] Int. Cl.$^4$ ..................... B01D 53/22; B01D 13/04; C08J 9/28
[52] U.S. Cl. ......................... 55/158; 55/16; 264/41; 264/129
[58] Field of Search ..................... 264/41, 129; 55/16, 55/158, 522, 524, 528

[56] References Cited

U.S. PATENT DOCUMENTS

| | | | |
|---|---|---|---|
| 4,358,378 | 11/1982 | Iwama et al. | 264/41 X |
| 4,364,759 | 12/1982 | Brooks et al. | 55/528 X |
| 4,378,400 | 3/1983 | Makino et al. | 264/41 X |
| 4,474,858 | 10/1984 | Makino et al. | 55/158 X |
| 4,484,935 | 11/1984 | Zampini | 55/158 |
| 4,486,202 | 12/1984 | Malon et al. | 55/158 |
| 4,488,886 | 12/1984 | Zampini | 55/158 |
| 4,512,893 | 4/1985 | Makino et al. | 55/158 X |
| 4,528,004 | 7/1985 | Makino et al. | 55/158 |
| 4,575,385 | 3/1986 | Brooks et al. | 55/528 X |
| 4,602,922 | 7/1986 | Cabasso et al. | 55/158 |

*Primary Examiner*—Philip Anderson
*Attorney, Agent, or Firm*—Spencer & Frank

[57] ABSTRACT

A method for producing integral, asymmetric membranes for separating mixtures of gases is disclosed. A membrane forming polymer, a solvent for the polymer, and a swelling agent are mixed to form a pourable liquid mixture; the solvent has a lower boiling point than the other components in the mixture, the polymer is not soluble in the swelling agent, and the swelling agent does not react with the polymer or the solvent. The liquid mixture is spread to form a thin film, the film is exposed to air or an inert gas to form a surface skin by evaporation and is thereafter contacted with a precipitation agent. A preferred integral, asymmetric membrane is produced when the membrane forming polymer is a polyetherimide, the solvent is a halogenated hydrocarbon and the swelling agent is one or more compound selected from the group consisting of an alkyl substituted benzene, an aliphatic carboxylic acid, and a chlorinated hydrocarbon.

13 Claims, 2 Drawing Figures

METHOD FOR PRODUCING AN INTEGRAL, ASYMMETRIC MEMBRANE AND THE RESULTANT MEMBRANE

BACKGROUND OF THE INVENTION

The present invention relates to a method for producing an integral, asymmetric membrane for the separation of gases from one another, wherein a membrane former, a solvent and a swelling agent are mixed together, spread out over an area to form a thin film, and brought into contact with a precipitation agent. It also relates to the membranes themselves, and to the various shapes in which the membranes may be embodied.

Separation of gases by means of membranes, in principle, is a very promising procedure. Compared to classical gas separation processes, such as cryogenic distillation and sorption processes, gas separation by means of membranes can be effected with noticeably less energy consumption and can take place isothermally without phase changes.

In this separation process, the membrane characteristics constitute a significant cost factor. First, the membrane must have suitable selectivity. If one wishes to separate gas A (e.g., helium or hydrogen) from gas B (e.g., nitrogen, methane or carbon monoxide), the membrane should have a selectivity $\alpha$ of at least 20. A selectivity of $\alpha A/B = 20$ means that with identical partial pressures, 20 times more gas A per unit time diffuses through the membrane than gas B.

Second, it is very important that the preferred component diffuse through the membrane at a sufficient flow rate. The greater the gas flow per unit area and unit time, the more economical the separation process will be. Since flow through a membrane is generally inversely proportional to its thickness, it is desirable to keep the thickness of a membrane as small as possible. In connection with the manufacture of very thin films, the limit of feasibility is soon reached, since thin films of a thickness of 1 micron or less are difficult to handle and can, therefore, rarely be manufactured without flaws. Moreover, the membrane cannot have a porous surface, as even micropores in an order of magnitude of $10^{-8}$ have devastating effects on the selectivity of a gas separating membrane.

One possibility for overcoming these difficulties is offered by the manufacture of so-called integral, asymmetric membranes. Such membranes are composed of a porous, voluminous substructure and a very thin (0.1 to 1 micron) skin constituting the actual separating membrane. Skin and substructure are made of the same material, cellulose acetate, and are produced practically in one processing phase.

The discovery of these membranes made desalination of sea water by reverse osmosis economically feasible. After this discovery, there was no lack of experimentation to produce integral, asymmetric membranes for gas separation purposes as well. As in the production of very thin films, it was discovered that it was usually impossible to produce the membrane skin so that it was free of micropores. At the present time, the only integral, asymmetric membrane free of pores that has gained some economic significance for gas separation purposes is a dried cellulose acetate membrane originally developed for sea water desalination (made by Separex, USA). The drying process for the initially water wet membrane involves a relatively complicated solvent exchange. If the wet cellulose acetate membranes are dried directly in air, the porous substructure collapses and a membrane that is almost gas impermeable results.

A further drawback of these finished membranes is their extraordinary water sensitivity. They are irreversibly destroyed by liquid water. Moreover, the membranes cannot be used at elevated temperatures (T > 70° C.) since changes in the material considerably reduce selectivity. For cellulose acetate, the maximum attainable He/N$_2$ selectivity lies at about 85 (average about 60).

SUMMARY OF THE INVENTION

In view of such difficulties, it was the object of the present invention to provide a separation process of the above type by providing novel, integral, asymmetric membranes with thin, pore-free skins of a suitable polymer that have high selectivity, are not sensitive to water, can be used at higher temperatures, and for which the manufacture, particularly precipitation and drying, is relatively simple.

The asymmetric membranes of the invention are prepared by mixing a suitable membrane forming polymer composition, a solvent for the polymer composition and a swelling agent; spreading the mixture over a broad area; and adding a precipitating agent. Preferably a polyetherimide is the membrane forming polymer composition, a halogenated hydrocarbon is the solvent, and one or more of an alkyl substituted benzene, an aliphatic carboxylic acid or a chlorinated hydrocarbon, are mixed in as the swelling agent. After the mixture is spread over a broad area, the film is precipitated by contacting with an organic liquid precipitating agent, and the membrane is dried in air or in an inert gas. After the membrane is formed it may be covered with an elastomer.

In various embodiments the membrane may be formed in the shape of a flat sheet, a tube, a coil module or a hollow fiber.

BRIEF DESCRIPTION OF THE DRAWINGS

The figures are photographs of cross-sections of asymmetric membranes according to the invention.

DETAILED DESCRIPTION OF THE EMBODIMENTS

Figure 2:
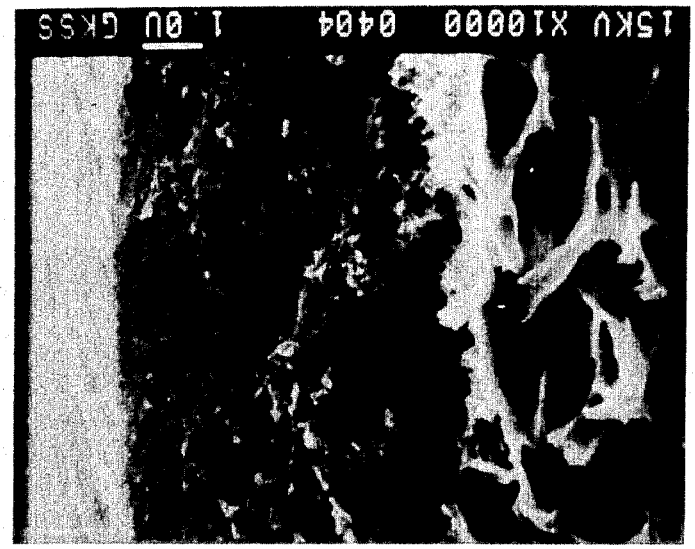
FIG. 2 shows a membrane with an open cell structure beneath the pore-free skin.

In developing the present invention, a commercially available plastic polyetherimide, a polymer having very good selectivity characteristics for the separation of light gases, such as helium and hydrogen, from heavy gases, such as nitrogen, methane and carbon monoxide, was selected as being a particularly advantageous polymer. However, I found that even thin films produced by known techniques from this plastic were unsuitable as gas separating membranes. Such films, having a thickness of about 5 microns, permit a helium flow of only $1.3 \cdot 10^{-2}$ m$^3$/m$^2$h bar, which is too low a flow to permit economical gas separation.

According to the present invention, however, an asymmetric gas separating membrane was produced which had an almost pore-free skin (approximately 0.2 microns thick) using a solution of polyetherimide in a solvent system. The solvent system I developed contains a volatile, genuine solvent for the polymer and at least one nonsolvent acting as a pore forming medium. This pourable solvent system is spread out to form a thin film which is then precipitated in an organic liquid. The precipitating agent is also not a solvent for polyetherimide. The precipitated membrane can then be dried in air. After drying, it can be used as a gas separating membrane having good selectivity and providing good flow. In addition, the selectivity of the membrane can even be increased considerably more if its surface is covered with a thin film of an elastomer such as silicone.

The membrane according to the present invention is superior with respect to selectivity and flow to all presently known gas separation membranes, particularly for the separation of light gases, such as helium and hydrogen, from heavier gases, such as nitrogen, methane and carbon monoxide.

The present invention will now be described in greater detail in regard to the embodiments illustrated in FIGS. 1 and 2.

The production of an asymmetric membrane 3 having a gas effective surface 1 and a supporting structure 2 begins with the establishment of a pourable solution. This solution, in principle, is composed of a polymer, a solvent, and at least one swelling agent (a nonsolvent). The solvent, of course, serves to dissolve the polymer. In addition, the solvent should have an excess dissolving capacity, i.e. it should be able to absorb not only the polymer but also the remaining components of the solution system. That is, the swelling agent must be miscible with the solvent. As will be seen in the examples below, the solvent should also have a lower boiling point than the other components of the solution. The swelling agent (nonsolvent) serves to produce a porous substructure. Porosity is directly proportional and thickness of the skin is inversely proportional to the concentration of the swelling agent (nonsolvent) in the pourable solution. However, there is an upper limit for the swelling agent concentration, above which no pore-free skin will be formed. If, on the other hand, the swelling agent is omitted entirely, no asymmetric film will normally be formed, only a dense, homogeneous membrane will result.

Thus, by varying the amounts and types of solvents, swelling agents (nonsolvents), a variety of different membranes can be formed from a given polymer. However, a correctly composed pourable solution is only one prerequisite for a membrane 3 to exhibit good flow and good selectivity.

The dynamics of the process after the clear pourable solution has been spread into a film is very important for the membrane characteristics. As soon as the pourable solution has been spread out, the highly volatile solvents begin to evaporate. Because evaporation at the interface (solution/air or inert gas) takes place much faster than the diffusion of the solvent through the solution to the interface, the polymer solution quickly becomes more concentrated at the surface exposed to the air or inert gas than in the remaining film. Moreover, the increase of polymer concentration at the interface is also initiated by the surface activity of the polymer. The polymer concentration at the surface soon becomes so high that the dissolved polymer is precipitated and forms surface skin 1.

Substructure 2 of membrane 3 is formed as follows: after skin 1 has been formed, the solvent evaporation rate and, thus, the polymer precipitation rate are reduced considerably, and substructure 2 turns into a gel much more slowly than skin 1. Due to the greater volatility of the solvent, the concentration of swelling agent is increased in the interior of membrane 3. Two phases are formed and the swelling agent forms small, dispersed droplets. Due to their surface activity, the polymer molecules accumulate at the surfaces of these droplets. The more the solvent evaporates, the more distinct this process becomes and the more densely the polymer coated swelling agent droplets congregate. If at this time the film is immersed into a precipitation bath, the thus formed state becomes fixed. The swelling agent and the remaining solvent diffuse through the skin into the precipitation bath, while the precipitation agent diffuses into membrane 3 and completely converts the polymer to the solid phase. Depending on the moment of precipitation and the kinetics of the precipitation process, a closed or an open cell structure is produced in the interior of the membrane.

Figure 1:
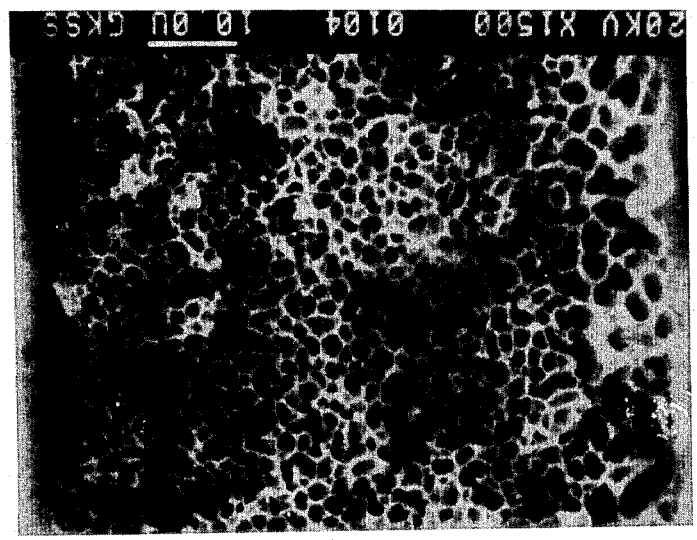
FIG. 1 shows a membrane with a closed cell structure.

FIG. 1 shows, for example, a photograph of a polyetherimide membrane 3 precipitated in toluene. Toluene diffuses slowly into the membrane, while the solvent diffuses comparatively quickly into the precipitation bath. The result is the formation of a closed pore structure, i.e. the individual sponge bubbles are surrounded by a closed polymer skin. Such a closed cell sponge structure noticeably reduces gas flow.

FIG. 2 is a photograph of a polyetherimide membrane 3 precipitated in acetone. Acetone leads to quick precipitation of the membrane. The result, therefore, is an open cell structure which presents only low resistance to the flow of gas and, therefore, has advantages for separating gases by membrane diffusion.

The production of polyetherimide membrane 3 is comparatively simple. A solution of polyetherimide is spread out as a film which is then precipitated in an organic liquid. Thereafter, the film is dried in air. The finished membrane can be used as is or, in order to increase selectivity, it may be provided with a thin silicone coating.

The pourable solution is composed of polyetherimide, at least one solvent, and at least one pore-forming substance that is a nonsolvent for polyetherimide (PEI).

The polyetherimide employed may be a commercially available plastic ("Ultem" made by General Electric). Other structurally related polyetherimides can also be used if they are soluble in one of the solvents mentioned below. The PEI content of the pourable solution may lie between 12 and 28 weight percent.

Partially halogenated hydrocarbons may be used as solvents; preferred among them are dichloromethane, 1,1,2-trichloroethane and 1,1,2,2-tetrachloroethane.

Additionally, the pourable solution must contain at least one pore-forming substance (swelling agent) which should be a nonsolvent for PEI. The swelling agent must not react with the PEI or with the solvent and should have a boiling point which lies at least 30° C. above the boiling point of the primary solvent. The following swelling agents can be used: carboxylic acids, particularly formic acid and acetic acid; alkyl benzenes, particularly toluene and xylene; chlorinated hydrocarbons which are nonsolvents for PEI, particularly trichloroethylene.

The swelling agent concentration in the pourable solution may lie between 5 and 40 weight percent. It should be selected to be as high as possible since the porosity of the membrane substructure 2 increases with an increasing swelling agent content, and the thickness of membrane skin 1 decreases. However, there is an upper limit for the swelling agent content, above which a dense skin 1 will no longer be formed.

All organic liquids which are nonsolvents for PEI but are completely miscible with all other components of the pourable solution can be used as membrane precipitation agents. The precipitation agent can be used to influence the pore structure and thickness of membrane skin 1. Acetone has been found to be a particularly favorable precipitation agent.

The production of asymmetric PEI membranes 3 of the above-described type is not bound to a certain module concept. Membranes can be produced for plate, tube or coil modules and also in the form of hollow fibers. For some module concepts it is of advantage that the membranes can be joined by welding.

Membranes 3 may be poured directly onto a supporting material or may be produced without a supporting layer and may be applied later to such a supporting layer. If the membranes are not drawn onto a supporting material, the pourable solution should be drawn out to form a film of 250 to 400 microns. The finished membrane then has a thickness of 100 to 160 microns. Gas flow through the membrane is not primarily dependent on the total thickness of the membrane, as it is only the skin which actually forms resistance. The dense skin has a thickness of 0.1 to 0.5 microns.

EXAMPLE 1

A pourable solution was made according to the following recipe:

| | |
|---|---|
| polyetherimide | 15.9 weight % |
| dichloromethane | 54.6 weight % |
| 1,1,2,2-tetrachloroethane | 4.8 weight % |
| xylene | 17.6 weight % |
| acetic acid | 7.1 weight % |

The clear pourable solution was applied to glass plates, at 18° C., to form a film of 375 microns thickness. After a brief evaporation period (about 3 seconds), the film was precipitated in an acetone bath at 16° C. The precipitation period was 30 minutes. Thereafter, the film was dried in air. One part of the membranes were initially tested regarding their permeability for the pure gases hydrogen, helium and nitrogen at a pressure of 5 bar. The other part of the membranes, however, were coated before the test with a thin film of silicone (about 0.5 micron). For this purpose, the membranes were welded to form pillows (skin outside). These pillows were dipped briefly into a diluted silicone solution containing a cross-linking agent. After the silicone had hardened, the pillows were cut apart again. Table 1 shows the results for comparison.

TABLE 1

| | Permeabilities m³/m² h bar | | | Selectivities | |
|---|---|---|---|---|---|
| | $H_2$ | He | $N_2$ | $(N_2/N_2)$ | $(He/N_2)$ |
| PEI membrane without silicone | 0.201 | 0.282 | 0.004 | 50 | 71 |
| PEI membrane with silicone | | | | | |
| tested at 20° C. | 0.192 | 0.250 | 0.0017 | 113 | 144 |
| tested at 80° C. | — | 0.765 | 0.0067 | — | 114 |

The results show that the silicone coating produces a considerable increase in selectivity. Since silicone itself has only poor selectivity (about 2.5), this increase can be explained only by a blockage of still existing micropores.

It can further be seen that helium flow can be approximately tripled by increasing the temperature from 20° C. to 80° C. Although selectivity decreased, it still showed excellent values.

The silicone coated membrane was also tested with He/$N_2$ gas mixtures at 20 bar. In a single-stage permeation process, for example, the helium content was increased from 79.7% to 99.8%.

EXAMPLE 2

The following exemplary cases show the effects produced by varying swelling agent and precipitation medium.

Solution A

| | |
|---|---|
| polyetherimide | 15.9 weight % |
| dichloromethane | 54.6 weight % |
| 1,1,2,2-tetrachloroethane | 4.8 weight % |
| xylene | 17.6 weight % |
| acetic acid | 7.1 weight % |
| acetone precipitation | |

Solution B
same as a but with toluene precipitation
Solution C

| | |
|---|---|
| polyetherimide | 19.4 weight % |
| dichloromethane | 66.9 weight % |
| 1,1,2-trichloroethane | 5.9 weight % |
| xylene | 3.9 weight % |
| acetic acid | 3.9 weight % |
| acetone precipitation | |

Solution D

| | |
|---|---|
| polyetherimide | 20.0 weight % |
| dichloromethane | 42.9 weight % |
| 1,1,2-trichloroethane | 3.8 weight % |
| trichloroethylene | 32.0 weight % |
| acetic acid | 1.3 weight % |
| acetone precipitation | |

All membranes were coated with silicone and tested as in Example 1 (at 20° C.). Table 2 shows the results for Solutions A–D.

TABLE 2

| Solution | Helium Permeability m³/m² h bar | Selectivity He/$N_2$ |
|---|---|---|
| A | 0.250 | 144 |
| B | 0.003 | 220 |
| C | 0.04 | 180 |
| D | 0.07 | 168 |

A comparison of the data for Solutions A and B shows the significant influence of the precipitation agent on membrane characteristics. Membrane B, in contrast to Membrane A, has a closed cell structure and a somewhat thicker skin; a drastic reduction in flow is the result.

In Solution C the swelling agent content was reduced. As already mentioned, this causes porosity to decrease and the thickness of the membrane skin to increase. Here again, a reduction in flow is the result. The same applies for Solution D. Although the swelling agent content was very high in solution D, the swelling agent was trichloroethylene. Trichloroethylene is not a solvent for PEI, however, it has a great affinity for this polymer. Consequently, and also due to its relatively low boiling point, the result was again low porosity and a thicker membrane skin 1.

The membrane according to the present invention is particularly suitable, among its may uses, for the recovery of helium from diving gases developed in deep sea diving habitats.

Other integral, asymmetric membranes may be formed according to the process of the invention for the separation of gases as long as the polymer is selected such that it forms a pore-free membrane that is permeable to at least one gas that is to be separated from a mixture of gases, a solvent is selected that is miscible with the swelling agent and is characterized by having a boiling point lower than the boiling points of all other ingredients, a swelling agent is selected that is not a solvent for the polymer and has a boiling point at least 30° C. above that of the solvent, and a precipitation agent is available that is not a solvent for the polymer but can diffuse into the membrane to solidify the polymer as set forth above.

The embodiments presented above are provided for the purpose of illustrating the invention. It is intended, however, that the invention be extended to all embodiments, modifications, adaptations and equivalents within the scope of the appended claims.

What is claimed is:

1. A method for producing integral, asymetrical membranes for separating gases in mixtures comprising:
    mixing together a polyether imide membrane forming polymer which forms membranes that are permeable to at least one gas in a mixture of gases, a volatile solvent for the polymer having a lower boiling point than any other component in the mixture, and an organic liquid swelling agent in which the polymer is not soluble and which does not react with either the polymer or the solvent to form a pourable liquid mixture, pore-free membranes that are permeable to at least one gas in the mixture of gases, the solvent is selected to have a lower boiling point than the other components in the mixture, and the swelling agent is selected to be an organic liquid in which the polymer is not soluble and which does not react with the polymer or the solvent;
    spreading said liquid mixture to form a thin film;
    exposing said film to air or an inert gas to form a surface skin by evaporation, and
    contacting said film with a precipitation agent to form an integral, asymmetric polyether imide membrane.

2. The method of claim 1, wherein the film is contacted with a precipitation agent consisting of an organic liquid in which the polymer is not soluble and is thereafter dried in the presence of air or an inert gas.

3. The method of claim 1, wherein the surface skin of the membrane is covered with an elastomer.

4. The method of claim 1, wherein the solvent and swelling agent are miscible, and the solvent is present in an amount sufficient to completely dissolve the polymer and the swelling agent.

5. The method of claim 1, wherein the membrane forming polymer is a polyetherimide, the solvent is a halogenated hydrocarbon and the swelling agent is one or more compound selected from the group consisting of an alkyl substituted benzene, an aliphatic carboxylic acid, and a chlorinated hydrocarbon.

6. The method of claim 1, wherein the membrane has an open cell substructure.

7. The method of claim 3, wherein the elastomer is silicone.

8. The method of claim 5, wherein the halogenated hydrocarbon solvent is one or more compound selected from the group consisting of dichloromethane, 1,1,2-trichloroethane and 1,1,2,2-tetrachloroethane.

9. The method of claim 5, wherein the swelling agent is one or more compound selected from the group consisting of formic acid, acetic acid, toluene, xylene and trichloroethylene.

10. The method of claim 9, wherein the concentration of the swelling agent in the pourable liquid mixture is between 5 and 40 weight percent.

11. The method of claim 5, wherein the precipitation agent is acetone.

12. A membrane produced according to the method of claim 1.

13. The membrane of claim 12, produced in the form of a plate, a tube, a coil module or a hollow fiber.

* * * * *